United States Patent [19]

Chang et al.

[11] Patent Number: 5,116,917
[45] Date of Patent: May 26, 1992

[54] THERMOPLASTIC POLYESTER LOW PROFILE ADDITIVES FOR VINYL ESTER RESINOUS COMPOSITIONS

[75] Inventors: Ken K. Chang, Dublin; Timothy A. Tufts, Powell, both of Ohio

[73] Assignee: Ashland Oil, Inc., Ashland, Ky.

[21] Appl. No.: 625,975

[22] Filed: Dec. 11, 1990

[51] Int. Cl.$^5$ .............................................. C08G 59/17
[52] U.S. Cl. ...................... 525/407; 525/438; 525/445; 525/48
[58] Field of Search .................. 525/407, 502, 44, 48, 525/49, 438, 445

[56] References Cited

U.S. PATENT DOCUMENTS

| | | | |
|---|---|---|---|
| 3,994,853 | 11/1976 | Hindersinn et al. | 525/44 |
| 4,172,059 | 10/1979 | Atkins et al. | 523/514 |
| 4,251,641 | 2/1981 | Arakawa et al. | 525/445 |
| 4,626,570 | 12/1986 | Gardner | 525/44 |

Primary Examiner—John C. Bleutge
Assistant Examiner—Randy Gulakowski
Attorney, Agent, or Firm—Mueller and Smith

[57] ABSTRACT

The present invention is directed to a thermosettable vinul ester resinous composition and low profile additive. The improvement comprises the low profile additive comprising a non-gelling, saturated polyester formed from dibasic acid and an ethylene oxide/propylene oxide polyether polyol having an EO/PO molar ratio ranging from about 0.1 to 0.9. The polyester has an acid value of greater than about 10 and preferably has a molecular weight of greater than about 6,000. The EO/PO polyether polyol can be built on a combination of diol, triol or other compound with active hydrogen groups, so long as the LPA product does not gel.

20 Claims, No Drawings

THERMOPLASTIC POLYESTER LOW PROFILE ADDITIVES FOR VINYL ESTER RESINOUS COMPOSITIONS

Background of the Invention

The present invention relates to thermosettable vinyl ester resinous compositions (e.g. sheet molding compound or SMC) and more particularly to new low profile additives therefor.

Vinyl ester resinous compositions are liquid thermosetting resins which are the reaction product of about equal amounts of a polyepoxide and an unsaturated monocarboxylic acid. These resins often are used in combination with fibrous reinforcement and inert fillers to manufacture composite structures often called sheet molding compound or SMC. One way to make such composite structures is to pre-mix the resin, filler, fibrous reinforcement, and other additives to form the molding compound. The molding compound then can be formed into the desired shape and cured in a heated, matched metal dye. An improvement in the process is chemical thickening of the relatively low viscosity liquid resin, e.g. with a Group II metal oxide or hydroxide and water, to form a high viscosity gel after the resin has been mixed with all other ingredients in the molding compound. This thickening or B-staging has several advantages. Unthickened molding compounds are sticky masses which are difficult to handle. After B-staging, they are firm solids whose surfaces are dry. In this form, they can be handled easily. During the molding operation, the molding compound flows within the dye set to fill the dye cavity. The increased viscosity of B-staged molding compounds inhibits segregation of the various components of the molding compound during flow and promotes compositional uniformity of the composite over the entire volume of the structure.

The advent of low shrink-low profile additives has led to a considerable growth in sheet molding compounds and bulk molding compounds, such as described above. Previous to the development of these additives, reinforced molded parts had rippled or undulating surfaces, which required laborious sanding operations or other corrective measures to obtain painted parts with a metal-like appearance. The low shrink-low profile additives exhibited great benefits to providing exceptionally smooth surfaces.

Polyether polyols have been used as anti-shrink or low profile control additives in unsaturated polyester systems (U.S. Pat. Nos. 4,472,544 and 4,483,963). U.S. Pat. No. 4,472,554 describes the usage of a very high level of acidified polyethertriol as the shrinkage control additive. U.S. Pat. No. 4,483,963 describes the reaction product of oligoester with unsaturated polyester as the low profile additive (LPA) for unsaturated polyester systems. In vinyl ester systems, polyether polyols also have been reported as being useful as low profile additives (U.S. Pat. Nos. 4,151,219, 4,347,343, and 4,824,919). Most of the molecular weights in compositions of prior art polyethers have disadvantages. For example, their molecular weights tend to be too low for good shrink control and most are not compatible with vinyl ester resins. Thus, there is a need in the art for LPAs that are compatible with vinyl ester resin (one phase) and maintain good mechanical properties and shrinkage control.

BROAD STATEMENT OF THE INVENTION

The present invention is directed to a thermosettable vinyl ester resinous composition and low profile additive. The improvement comprises the low profile additive comprising a non-gelling, saturated polyester formed from dibasic acid and an ethylene oxide/propylene oxide polyether polyol having an EO/PO molar ratio ranging from about 0.1 to 0.9. The polyester has an acid value of greater than about 10 and preferably has a molecular weight of greater than about 6,000. The EO/PO polyether polyol can be built on a combination of diol, triol or other compound with active hydrogen groups, so long as the LPA product does not gel.

Advantages of the present invention include LPAs especially adapted for use with vinyl ester resins. The novel LPAs are compatible with the vinyl ester resin as indicated by their exhibiting an ostensibly one-phase system. Yet another advantage is a vinyl ester resin/LPA system which exhibits good mechanical properties and shrinkage control. These and other advantages will be readily apparent to those skilled in the art based upon the disclosure contained herein.

DETAILED DESCRIPTION OF THE INVENTION

Referring initially to the ethylene oxide/propylene oxide (EO/PO) polyether polyol block copolymer component of the low profile additive (LPA) of the present invention, the molar ratio of EO to PO ranges from about 0.1 to about 0.9. Ethylene oxide and propylene oxide can be co-reacted to form the polyether polyol, or the polyether polyol can be built on a di- or tri-functional compound which contains groups reactive with ethylene oxide and propylene oxide. Such suitable groups include, for example, hydroxyl groups, thiol groups, acid groups, and amine groups. Accordingly, diols, triols, dithiols, trithiols, diacids, triacids, diamines, triamines and the like are suitable multi-functional compound which can be reacted with ethylene oxide and propylene oxide for synthesizing the EO/PO block copolymer of the present invention. Suitable such compounds include, for example, alkylene glycols, typically ranging from about 2 to 8 carbon atoms (including cycloalkylene glycols). Illustrative of such diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methyl pentane,1,5-diol, 1,4-cyclohexanedimethanol, and the like, and mixtures thereof. Diethylene glycol, dipropylene glycol, triethylene glycol, tripropylene glycol, and the like additionally can be used as necessary, desirable, or convenient. Suitable tri-functional compounds include, for example, glycerin, trimethylol propane, pentaerythritol, and like triols; dithierythritol, dithiothritol, citric acid, trioxypropylene triamine, trioxyethylene triamine, and the like, and mixtures thereof.

In building the EO/BO block copolymer, it is important that the LPA does not gel, but remain a liquid, which requirement places molecular weight and branching restrictions on the block copolymer as those skilled in the art will appreciate. Additionally, the block copolymer should not contain ethylenic unsaturation in the backbone, as the examples will demonstrate.

The block copolymer then is reacted with a dibasic acid, which can be aliphatic or aromatic. Examples of dibasic acids well known in the polyester art include, for example, glutaric acid, adipic acid, pimelic acid, suberic acid, azelaic acid, sebasic acid, dodecanedioic acid, isophthalic acid, orthophthalic acid, terephthalic acid, corresponding anhydrides, and the like, and mixtures thereof. Preferably, such suitable dicarboxylic acids contain from about 4 to 12 carbon atoms.

Generally, the temperature of esterification is maintained in the range of about 150°-230° C. and an esterification catalyst is used. Such catalysts are conventional and include, for example, titanium tetrachloride, zinc acetate, zinc oxide, stannous oxylate, dibutyl tin oxide, and the like. Conventional color stabilizers, e.g. trilauryl phosphite or the like, also can be included in the reaction mixture. The proportion of acid to EO/PO block copolymer is such that the resulting LPA has an acid value of greater than 10 and such value can range on up to about 30. Additionally, the molecular weight of the LPA is preferred to be over 6,000 with a useful range of molecular weight being up to about 60,000.

Referring to the vinyl ester resins, reference is made to the following citations: U.S. Pat. Nos. 3,564,074, 4,151,219, 4,347,343, 4,472,544, 4,483,963, 4,824,919, 3,548,030, and 4,197,390. These resin systems include a terminally unsaturated vinyl ester resin in admixture with at least one copolymerizable monomer. Generally, the resins are mixed with styrene for thermally cured reinforced articles, but for radiation cure other monomers are more preferable, including, for example, alkyl acrylates or hydroxy alkyl acrylates. Terminally unsaturated vinyl ester resins, as taught in the foregoing citations, are prepared by reacting about equivalent proportions of a polyepoxide and an unsaturated monocarboxylic acid wherein the resulting resin has terminal, polymerizable unsaturated groups. For example, two equivalents of methacrylic acid may be reacted with two equivalents of a polyepoxide resin to produce a vinyl ester resin. As stated above, vinyl ester resins are well known in the art as set forth in the citations set forth above. The proportion of inventive LPA incorporated into the vinyl ester resin generally ranges from about 5 to 20 weight parts per 100 weight parts of vinyl ester resin. The compounding of such vinyl ester resinous compositions is well known in the art and little more need be said with respect thereto here.

Additionally, additives incorporated into the vinyl ester resinous composition are conventional in nature. Accordingly, suitable curing agents, accelerating agents, and the like are incorporated. Reinforcement and inert additives and fillers such as glass, metal filings, and inorganic fillers such as sand or clay also are appropriate. Pigments, release agents, plasticizers, and the like also are used as is necessary, desirable, or convenient in conventional fashion.

The following examples show how the present invention has been practiced, but should not be construed as limiting. In this application, all percentages and proportions are by weight and all units are in the metric system, unless otherwise expressly indicated. Also, all citations are expressly incorporated herein by reference.

EXAMPLE 1

In order to prepare the inventive polyester LPA, 800 g of BASF-628 EO/PO block polyether polyol (typical properties: OH no. 24.5 mg KOH/gm, pH apparent 9.1, density @ 25° C. 8.5 lbs/gal, and Brookfield viscosity @ 25° C. 1,100 cps), 50 g of isophthalic acid, and 0.82 g of monobutyl tin oxide were charged into a 2-liter glass reactor. A nitrogen sparge was maintained in the reactor and the contents heated to 215° C. This reaction temperature was held until the acid value was determined to be between about 12 and 15. The reactor contents then were cooled to 150° C. and 13 g of phthalic anhydride were charged into the reactor. The reactor temperature was maintained at 150° C. for two additional hours. The acid value of the resulting polyester LPA was between about 20 and 25.

The reactor contents there were cooled to 140° F. Benzoquinone (0.23 g) was dissolved into 288.6 g of styrene and this mixture charged into the reactor. The resulting acid value of the reactor contents was between about 13 and 18. The resulting product was a 75% solution of the polyester LPA of the present invention in styrene. This solution will be used as the LPA in the remaining examples.

EXAMPLE 2

A thickenable vinyl ester resin suitable for SMC application was prepared in a two-liter resin kettle equipped with a stirrer, temperature controller, oxygen sparge tube, and condenser. Into the reactor was charged: an epoxy resin, 529.5 wt-parts of a glycidyl polyether of 2,2-bis(4-hydroxyphenyl) propane having $M_n = 350$ and an equivalent weight of about 170–190, 2,2-bis (4-hydroxyphenyl) propane (157.8 wt-parts), and tetramethylammonium chloride (0.54 wt-parts). This mixture was heated for one hour at 171° C. Thereafter, methacrylic acid (128.8 wt-parts), hydroquinone (0.927 wt-parts), and additional tetramethylammonium chloride (4.36 wt-parts) was added to the reactor and the combined mixture heated for three hours at 115° C. under a nitrogen/air sparge.

After cooling the reaction mixture, 547 wt-parts of styrene was added. The kettle then was heated to 76° C. and 13.6 wt-parts of maleic anhydride and 0.16 wt-parts of benzoquinone were added to the kettle. The reaction temperature then was maintained between about 76° and 80° C. for one-half hour. Thereafter, an additional 20.53 wt-parts of maleic anhydride were added to the kettle and the reaction temperature maintained at about 76°–80° C. for another half hour. The final acid value of the thickenable vinyl ester resin was 30.

EXAMPLE 3

Compositions were compounded from the vinyl ester resin of Example 2 and various LPAs from the prior art and Example 1. Samples were formulated to contain 10 PHR (wt-parts per 100 wt-parts of vinyl ester resin) of the LPA. The compatibility of the various LPAs with the vinyl ester resin were compared and the following results recorded.

TABLE 1

| LPA | OBSERVATION |
| --- | --- |
| Comparative | |
| BASF-P-4010 propylene oxide diol | 2 layers |
| BASF-P-4040 propylene oxide triol | 2 layers |
| BASF-628 (EO/PO - 25/75) | miscible |
| Inventive | |
| BASF-628/isophthalic acid polyester | miscible |
| BASF-628/adipic acid polyester | miscible |

The two prior art polyether polyols are unsuitable for use in preparing SMC due to their incompatibility with the vinyl ester resin. Both the isophthalic acid and adipic acid polyester versions of the inventive LPAs, however, were miscible with the vinyl ester resin as was the unmodified EO/PO polyether polyol.

EXAMPLE 4

In this example, various LPAs were compounded with the vinyl ester resin of Example 2 and shrinkage rates determined. The SMC formulation compounded is set forth below.

TABLE 2

| Ingredient | Amount (g) |
|---|---|
| Vinyl ester resin (60% in styrene) | 212.5 |
| LPA (60% in styrene) | 37.5 |
| t-butyl perbenzoate | 3.75 |
| Zinc stearate | 11.25 |
| CaCO₃ | 250 |

The formulations then were compression molded at 300° F. for 2 minutes at 600 psi. This shrinkage data and LPAs evaluated are set forth below.

TABLE 3

| LPA | LPA AMT (phr) | % Shrinkage |
|---|---|---|
| Comparative | | |
| BASF-628 end capped with succinic anhydride | 9 | 1.89 |
| BASF-628 end capped with maleic anhydride | 9 | 2.1 |
| Inventive | | |
| BASF-628/adipic acid polyester | 9 | 1.1 |
| BASF-628/adipic acid polyester | 12 | 0.8 |
| BASF-628/isophthalic acid polyester | 12 | 0.88 |

As the above-tabulated results demonstrate, the inventive LPAs provide substantially reduced shrinkage of the molded part compared to the comparative LPAs. Note the improvement at increasing levels of the inventive LPA.

EXAMPLE 5

Lower acid values of the inventive polyester LPAs can cause the separation of the SMC paste prepared from MgO thickened vinyl ester resinous compositions. An LPA formulated from BASF-628 and adipic acid to an acid value of 6 was prepared and mixed with the vinyl ester resin of Example 2 and then thickened with MgO. The thickened SMC paste separated after 1 day. When the same LPA candidate was formulated to have an acid value above 10, however, a stable and homogeneous one-phase SMC paste was obtained. Thus, the preference in the present invention for the inventive polyester LPA to have an acid value of greater than about 10.

EXAMPLE 6

In this Example, the effect of molecular weight of shrinkage control of the inventive LPAs was evaluated. The vinyl ester resin of Example 2 was compounded with 9 PHR of the various LPA candidates and the shrinkage of the resulting compression molded part (See Example 4) was determined.

TABLE 4

| LPA | Molecular Weight | % Shrinkage |
|---|---|---|
| Comparative | | |
| BASF-628 end capped with succinic anhydride | 4,026 | 1.89 |
| Inventive | | |
| LPA of Example 1 | 8,164 | 1.15 |
| LPA of Example 1 | 13,510 | 1.05 |
| LPA of Example 1 | 22,100 | 1.03 |

As the above-tabulated data demonstrates, all of the inventive LPAs provided improved shrinkage control compared to similar LPAs merely end-capped with acid functionality. With respect to the inventive LPAs, increasing molecular weights provided improved shrinkage control. Even at lower molecular weights, however, the inventive LPAs provide improved shrinkage control compared to prior art LPAs.

EXAMPLE 7

In this Example, the effect of both adipate and isophthalate LPAs on shrinkage control of glass reinforced vinyl ester SMC plaques was evaluated. The formulations compounded and the mechanical properties determined are set forth below.

TABLE 5

| Formulation | Sample (wt-parts) | | | |
|---|---|---|---|---|
| | A | B | C | D |
| Vinyl Ester Resin (II) (60% solid in styrene) | 97.3 | 82.7 | 85.95 | 82.7 |
| Polyester of polyether polyol LPA (I) (60% solids in styrene) | 0 | 14.60 | 11.35 | 14.60 |
| Other additives | 3.6 | 3.6 | 3.6 | 3.6 |
| T-Butyl Perbenzoate | 1.5 | 1.5 | 1.5 | 1.5 |
| Zinc Stearate | 4.5 | 4.5 | 4.5 | 4.5 |
| CaCO₃ | 100 | 100 | 100 | 100 |
| 1" Glass | 113.6 | 113.6 | 113.6 | 113.6 |
| MgO thickening agent | 4.0 | 4.0 | 4.0 | 4.0 |

The quantities listed on the table above are by parts by weight.

TABLE 6

| Mechanical Property | Sample (wt-parts) | | | |
|---|---|---|---|---|
| | A No LPA | B 9 phr Example I Isophthalate | C 7 phr Example I Isophthalate | D 7 phr Example I (Adipate) |
| Flex Strength (psi) | 33,800 | 25,987 | 29,740 | 30,123 |
| Flex Modulus (psi) | $1.76 \times 10^6$ | $1.38 \times 10^6$ | $1.51 \times 10^6$ | $1.56 \times 10^6$ |
| Tensile Strength (psi) | 16,360 | 12,838 | 14,555 | 14,171 |
| Tensile Modulus (psi) | $1.96 \times 10^6$ | $1.58 \times 10^6$ | $1.62 \times 10^6$ | $1.59 \times 10^6$ |
| Elongation (%) | 1.588 | 1.503 | 1.523 | 1.460 |
| H₂O Absorption | 0.254% | 0.365% | 0.255% | 0.214% |
| Cold Mold/Cold Part 12" × 12" plaque | −12 mil | +2 mil | −3 mil | +1 mil |

+ = Expansion;
− = Shrinkage

The formulations containing the inventive LPAs exhibited better shrinkage control than the comparative sample without any LPA added thereto. It will be observed that good mechanical properties were exhibited by the formulations containing the inventive LPAs.

EXAMPLE 8

This Example, illustrates the extent of the expansion that the inventive LPAs can achieve with various levels thereof. The SMC pastes were prepared and glass reinforced SMC plaques were molded and evaluated.

TABLE 7

| | (wt-parts) | | | | |
|---|---|---|---|---|---|
| Formulation | Sample A 12 phr Adipate LPA | Sample B 18 phr Adipate LPA | Sample C 15 phr Adipate LPA | Sample D 12 phr Isophthalate LPA | Sample E 15 phr Isophthalate LPA |
| Vinyl Ester Resin (II) [60% solid in styrene] | 77.84 | 68.11 | 72.98 | 77.84 | 72.98 |
| Ester of Polyether Polyol LPA (I) [60% solid in styrene] | 19.46 | 29.19 | 24.33 | 19.46 | 24.33 |
| Other Additives | 3.6 | 3.6 | 3.6 | 3.6 | 3.6 |
| T-Butyl Perbenzoate | 1.5 | 1.5 | 1.5 | 1.5 | 1.5 |
| Zinc Stearate | 6.0 | 3.0 | 4.5 | 4.5 | 4.5 |
| $CaCO_3$ | 100 | 100 | 100 | 100 | 100 |
| MgO Thickening Agent | 3.0 | 3.0 | 3.0 | 3.0 | 3.0 |
| 1" Glass | 113.6 | 113.6 | 113.6 | 113.6 | 113.6 |

TABLE 8

| | (wt-parts) | | | | |
|---|---|---|---|---|---|
| Formulation | Sample A 12 phr Adipate LPA | Sample B 18 phr Adipate LPA | Sample C 15 phr Adipate LPA | Sample D 12 phr Isophthalate LPA | Sample E 15 phr Isophthalate LPA |
| Flex Strength (psi) | 27,510 | 16,820 | 22,570 | 25,540 | 17,810 |
| Flex Modulus (psi) | $1.63 \times 10^6$ | $0.95 \times 10^6$ | $1.53 \times 10^6$ | $1.63 \times 10^6$ | $1.30 \times 10^6$ |
| Tensile Strength (psi) | 13,330 | 9,478 | 9,160 | 11,780 | 8,828 |
| Tensile Modulus (psi) | $1.70 \times 10^6$ | $1.31 \times 10^6$ | $1.31 \times 10^6$ | $1.60 \times 10^6$ | $1.59 \times 10^6$ |
| Elongation (%) | 1.513 | 1.36 | 1.31 | 1.18 | 1.00 |
| Cold Mold/Cold Part 12" × 12" plaques | +4 mil | +10 mil | +8 mil | +7 mil | +7 mil |

"+" = Expansion
"−" = Shrinkage

As shown in the above-tabulated data, up to 10 mil expansion of SMC reinforced plaques can be achieved when high levels of LPA are used.

We claim:

1. In a thermosettable vinyl ester/low profile additive resinous composition, the improvement which comprises said low profile additive comprising a non-gelling, saturated polyester formed from dibasic acid and an EO/PO block copolymer having an EO/PO molar ratio ranging from about 0.1 to 0.9, said polyester having an acid value of greater than about 10.

2. The composition of claim 1 wherein said block copolymer includes a compound having groups reactive with EO and PO.

3. The composition of claim 2 wherein said groups of said compound are selected from one or more of hydroxyl groups, thiol groups, carboxyl groups, and amine groups.

4. The composition of claim 2 wherein said compounds are selected from one or more of the following: alkylene glycols having between 2 and 8 carbon atoms, diethylene glycol, dipropylene glycol, triethylene glycol, tripropylene glycol, glycerine, trimethylol propane, pentaerythritol, dithioerythritol, dithiothritol, citric acid, trioxypropylene triamine, and trioxyethylene triamine.

5. The composition of claim 1 wherein said dibasic acid contains between about 4 and 12 carbon atoms.

6. The composition of claim 5 wherein said dibasic acid is selected from one or more of glutaric acid, adipic acid, pimelic acid, suberic acid, azelaic acid, sebasic acid, dodecanedioic acid, isophthalic acid, orthophthalic acid, terephthalic acid, and their corresponding anhydrides.

7. The composition of claim 1 wherein said polyester has an acid value ranging from between about 10 and 30.

8. The composition of claim 1 wherein said polyester has a molecular weight of greater than about 6,000.

9. The composition of claim 8 wherein said molecular weight ranges from between about 6,000 and 60,000.

10. The composition of claim 7 wherein said polyester has a molecular weight of between about 6,000 and 60,000.

11. In a method for making a thermosettable vinyl ester/low profile additive resinous composition, the improvement which comprises blending with said vinyl ester a low profile additive which comprises a non-gelling, saturated polyester formed from dibasic acid and an EO/PO block polymer having an EO/PO molar ratio ranging from about 0.1 to 0.9, said polyester having an acid value of greater than about 10.

12. The method of claim 11 wherein said block copolymer includes a compound having groups reactive with EO and PO.

13. The method of claim 12 wherein said groups of said compound are selected from one or more of hydroxyl groups, thiol groups, carboxyl groups, and amine groups.

14. The method of claim 12 wherein said compounds are selected from one or more of the following: alkylene glycols having between 2 and 8 carbon atoms, diethylene glycol, dipropylene glycol, triethylene glycol, tripropylene glycol, glycerine, trimethylol propane, pentaerythritol, dithioerythritol, dithiothritol, citric acid, trioxypropylene triamine, and trioxyethylene triamine.

15. The method of claim 11 wherein said dibasic acid contains between about 4 and 12 carbon atoms.

16. The method of claim 15 wherein said dibasic acid is selected from one or more of glutaric acid, adipic acid, pimelic acid, suberic acid, azelaic acid, sebasic acid, dodecanedioic acid, isophthalic acid, orthophthalic acid, terephthalic acid, and their corresponding anhydrides.

17. The method of claim 11 wherein said polyester has an acid value ranging from between about 10 and 30.

18. The method of claim 11 wherein said polyester has a molecular weight of greater than about 6,000.

19. The method of claim 18 wherein said molecular weight ranges from between about 6,000 and 60,000.

20. The method of claim 17 wherein said polyester has a molecular weight of between about 6,000 and 60,000.

* * * * *